United States Patent [19]

Armistead et al.

[11] 4,219,344

[45] Aug. 26, 1980

[54] METHOD OF PRODUCING MANGANESE CORDIERTIE GLASS-CERAMICS

[75] Inventors: William H. Armistead; Irwin M. Lachman, both of Corning, N.Y.

[73] Assignee: Corning Glass Works, Corning, N.Y.

[21] Appl. No.: 40,967

[22] Filed: May 21, 1979

Related U.S. Application Data

[60] Division of Ser. No. 944,856, Sep. 22, 1978, which is a continuation-in-part of Ser. No. 899,369, Apr. 24, 1978, abandoned.

[51] Int. Cl.$^2$ .................. C03B 19/06; C03B 32/00
[52] U.S. Cl. ............................. 65/18; 65/33
[58] Field of Search ............... 106/52, 62, 39.6, 73.4; 65/18, 33; 264/56

[56] References Cited

U.S. PATENT DOCUMENTS

| | | | |
|---|---|---|---|
| 3,450,546 | 6/1969 | Stong | 106/39.6 |
| 3,885,977 | 5/1975 | Lachman et al. | 106/73.4 X |
| 3,926,648 | 12/1975 | Miller | 106/39.6 |
| 3,926,838 | 12/1975 | Reade | 106/39.6 X |
| 3,940,255 | 2/1976 | Harrington et al. | 65/33 |
| 3,950,175 | 4/1976 | Lachman et al. | 106/62 X |
| 4,015,048 | 3/1977 | Martin | 106/39.6 X |
| 4,142,879 | 3/1979 | Fritsch, Jr. et al. | 65/18 |

FOREIGN PATENT DOCUMENTS 888227  1/1962  United Kingdom.

*Primary Examiner*—Richard V. Fisher
*Attorney, Agent, or Firm*—Richard N. Wardell; Clinton S. Janes, Jr.

[57] ABSTRACT

Glass-ceramic products having a manganese-containing cordierite crystal structure and being impervious void free bodies exhibiting low coefficients of thermal expansions of $\sim 15 \times 10^{-7}/°C$. (25°—1000° C.) and high electrical resistivity are obtained by the sintering of glass or glass-ceramic powders having the molar composition of about $2RO.2Al_2O_3.5SiO_2$, wherein RO is a combination of MgO and MnO.

10 Claims, No Drawings

METHOD OF PRODUCING MANGANESE CORDIERTIE GLASS-CERAMICS

CROSS-REFERENCE TO RELATED APPLICATIONS

This is a division of application Ser. No. 944,856 filed Sept. 22, 1978, which in turn is a continuation-in-part of application Ser. No. 899,369 filed April 24, 1978, now abandoned.

BACKGROUND OF THE INVENTION

It is known in the art that the sintering of glass-ceramic cordierite articles formed from glass powders of stoichiometric composition $2MgO.2Al_2O_3.5SiO_2$ is very poor in that porous, granular, mechanically weak products are produced. Various methods for improving the sinterability of cordierite glass-ceramics, while maintaining its favorable qualities of high refractoriness, low coefficients of thermal expansion and excellent thermal insulating properties, have been disclosed in the prior art.

U.S. Pat. No. 3,450,546 describes the manufacturing of transparent cordierite glass-ceramics from glass powders by utilizing brief sintering treatments followed by consolidation-crystallization treatments at temperatures in the 1200°–1425° C. range. This method, however, was found to severely restrict the utility of cordierite compositions for use in preparing complex articles, coatings or seals. U.S. Pat. No. 3,926,648 discloses a method of improving the sinterability of cordierite glass-ceramic compositions by additions of minor amounts of $K_2O$ and/or $Cs_2O$ (0.3–1.5 mole percent) to glasses near the cordierite stoichiometry. In addition, U.S. Pat. No. 4,015,048 discloses additions of controlled amounts (0.7–5.6 mole percent) of one or more modifying oxides selected from the group consisting of BaO, PbO, SrO and CaO, to improve the sinterability of glasses having a cordierite composition.

The addition of minor amounts of manganese oxides (3–4 wt.%), to mineral raw batch materials having a cordierite composition in order to lower the firing temperature and increase the sinterability of such mineral batches is described in British Pat. No. 888,227. This process, however, required the addition of a fluxing agent which had the negative effect of increasing the coefficients of thermal expansion of the fired body. U.S. Pat. No. 3,885,977 discloses and claims an anisotropic polycrystalline sintered ceramic product, having cordierite as its primary phase in which as much as 98% of the MgO can be replaced by MnO in the raw batch. This patent, however, fails to disclose or suggest the forming of an impervious void-free product as a result of such replacements.

SUMMARY OF THE INVENTION

The invention comprises the forming of glass-ceramic products having a manganese-containing cordierite crystal structure, which have been sintered to impervious or void free bodies or coatings while maintaining the favorable cordierite qualities of high electrical resistivity and low thermal expansion. This is accomplished by the sintering of glass or glass-ceramic powders within the compositional range of $1.7–2.4RO.1.9–2.4Al_2O_3.4.5–5.2SiO_2$, where RO is a combination of from 25–90 mole MnO % and from 10–75 mole % MgO.

Increased sinterability to imperviousness, coupled with low thermal expansion, is obtained when the composition of the glass or glass-ceramic powders is similar to that of the stoichiometric cordierite composition (i.e., $2RO.2Al_2O_3.5SiO_2$). Further, a more desirable compositional range for RO is from 40–80 mole % MnO and from 20–60 mole % MgO, especially where the stoichiometric cordierite composition is approached. Thermal expansion values of $12 \times 10^{-7}/°C$. (25°–1000° C.) have been obtained when the glass-ceramic product has the preferred composition of $2(0.70MnO.0.30MgO).2Al_2O_3.5SiO_2$.

In fabricating the products of this invention, raw batch materials which form glasses within the desired compositional range of $1.7–2.4RO.1.9–2.4Al_2O_3.4.5–5.2SiO_2$ are melted. The impervious sintered glass-ceramic products can be formed from glasses produced in this manner by fashioning powders derived from the glass into the desired products, and then firing the powders to a temperature of from 950° C. to 1300° C. for a sufficient time to sinter the product to imperviousness. The powders prepared from the glass can be fashioned into the desired product by any of the usual ceramic techniques including, but not limited to, dry pressing, slip casting or extrusion. It is preferable in practicing this invention to directly reduce the glass to a powder having desired particle size, then form the glass powder into the desired product and sinter to the impervious product having the cordierite crystal structure. It is also possible, however, to form the product by heat treating to substantially crystallize (ceram) the glass, before or after it has been reduced to a particulate form, to the cordierite crystal structure, and then reducing the crystallized powders to the desired particle size prior to forming such powders into the desired product, which is then fired to the impervious product.

DETAILED DESCRIPTION OF THE INVENTION

In accordance with this invention, impervious cordierite glass-ceramic articles and coatings of complex design, having good electrical properties and low thermal expansion, can be easily fabricated.

In preparing the glass powders of this invention, the raw batch ingredients may comprise any constituent, whether oxides or other compounds, which will be converted to the desired oxides in the proper proportions at the temperature required for melting the batch. The temperature for melting the raw batch was found to vary as the amount of MnO varies in the batch. The practical melting range, as a result, can vary from 1650° C. at lower MnO concentrations to 1550° C. for higher concentrations of MnO.

The molten glass formed can then be drigaged (poured as a fine stream into water) or cast into slabs and thereafter ground into powder by any known method. Ball milling and troast (fluid energy) milling were two techniques utilized for subdividing the glass granules to a fine powder of −325 mesh (Tyler). A median particle size within the range of 8–12 microns is preferable.

Glass powders within the scope of this invention can have the broad compositional range, on a mole basis, of $1.7–2.4RO$, $1.9–2.4Al_2O_3.4.5–5.2SiO_2$, where RO is a combination of from 25–90 mole % MnO and from 10–75 mole % MgO.

More desirable products of this invention are produced however, where the stoichiometric composition of cordierite is approximated (i.e., where the composition is represented by the formula 2RO.2Al$_2$O$_3$.5SiO$_2$).

The crystallization (ceramming) process of the glass particles or powders to the cordierite structure begins at about 700° C.–900° C. with β-quartz being the first phase to crystallize at about 900° C. Differential thermal analysis data (ΔTA) indicate that complete crystallization to the manganese-containing cordierite structure occurs within the range from 950° C.–1200° C., depending on the relative compositions of MgO and MnO. For compositions high in MgO >60 mole %, the β-quartz phase was found to persist to temperatures of 950° C., at which point the Mn-cordierite would begin to crystallize. Where, however, MnO concentrations were >40 mole %, the β-quartz phase gave way to additional unidentified phases prior to crystallization to Mn-cordierite at around 1150° C. It is necessary, therefore, to fire about 950° C. to insure crystallization to the cordierite crystal structure. Firing to insure complete crystallization should be within the range 950°–1200° C., dependent upon the relative amounts of MnO and MgO present. Normally, total soak time (time within the firing range) is not critical and 1 hour was found to be practical, except for the firing of large articles made from glass powders. From the above it is apparent that sinterability of the glass powders of this invention to the cordierite crystal structure progressively increases with increasing MnO concentrations or conversely compositions richer in MnO have increased sinterability. Compositions having a >90 mole % MnO concentration were found to have extremely high coefficients of thermal expansions ~60×10$^{-7}$/°C. (room temperature to 1000° C.) which is thought to be attributable to the forming of additional non-cordierite phases.

In general a firing temperature higher than 1300° C. may also cause formation of several non-cordierite phases in products prepared in accordance with this invention. This maximum stability temperature is however somewhat flexible; for while 1300° C. may be the maximum stable temperature for an MnO-rich (80-90 mole % of RO) sample, a sample rich in MgO (~75 mole % of RO) may remain stable and not deteriorate to temperatures of 1450° C. It has been found that after crystallization (ceramming) of the glass powders to the cordierite structure, the firing range for forming the impervious products from the cerammed powders is narrower (1250°–1300° C.) than the firing range for the products formed directly from the glass powders (950°–1300° C.).

When the products being sintered are formed of glass powders, the degree of densification, the sinterability and shrinkage of the final product of this invention can be influenced by the rate at which it is fired. In general slow firing on the order of 20°–25° C./hr. was found to produce less dense objects having decreased firing shrinkage and lower thermal expansions than the same objects when fired at higher rates, for example, 200° C.–300° C./hr. It is thought that the slower firing favors crystallization to the cordierite structure by allowing the material sufficient time to achieve equilibrium. While any firing environment will produce the impervious glass-ceramic bodies formed by either process disclosed, firing in a vacuum or in oxygen produce bodies which are also void free.

When forming the glass-ceramic product by the direct sintering of articles fashioned from glass powders, the method utilized to subdivide the glass to powder was also found to have an effect on the sinterability to imperviousness and the thermal expansion of the final product. Ball milled glass powders were found to be contaminated somewhat by aluminous material attrited from the grinding balls. Samples produced from ball milled powders can profit from a faster firing schedule since fast firing would increase densification to imperviousness. Thermal expansions of samples obtained from ball milled powders ranged from 14–22×10$^{-7}$/°C. (25°–1000° C.) where MnO ranged from 25–90 mole % of RO. For any given ball milled composition, a similar composition prepared by troast milling (fluid energy milling) would produce an article having a slightly lower coefficient of thermal expansion and which more readily sinters to imperviousness. Troast milling, however, is the preferred method for comminuting glasses of the invention to powders. Where maximum densification is required, it may be preferable to increase sinterability by troast milling the glass powders instead of increasing the relative amounts of MnO in the glass composition, which would have the negative effect of decreasing the service temperature of the glass-ceramic article produced.

Glass-ceramic products of this invention have coefficients of thermal expansion on the order of 12–22×10$^{-7}$/°C. (25°–1000° C.). Lower expansion coefficient values of from 12–17×10$^{-7}$/°C. over the same temperature range is possible when MnO concentration ranges from 40–80 mole % of RO and MgO ranges from 20–60 mole % of RO, especially when the overall composition has the molar composition 2RO.2Al$_2$O$_3$.5SiO$_2$.

It will be appreciated from the above discussion that firing rates, the method of reducing the glass to powder (troast milling v. ball milling), the relative MnO and MgO concentrations and the proximity to cordierite stoichiometry are all variables which affect the thermal expansion, sinterability and degree of densification of the articles or coatings produced in accordance with this invention when the products are directly formed from glass powders. Only the latter two variables mentioned above, however, affect the sinterability and degree of densification of products produced from cerammed powders.

EXAMPLES OF EMBODIMENTS

Samples 2–7 recited in Table I below comprise glass compositions of this invention where batch materials are reported in terms of parts by weight on the oxide basis.

TABLE I

|  | 1 | 2 | 3 | 4 | 5 | 6 | 7 |
|---|---|---|---|---|---|---|---|
| Mole % MnO | 0 | 25 | 40 | 55 | 70 | 80 | 90 |
| Mole % MgO | 100 | 75 | 60 | 45 | 30 | 20 | 10 |
| Batch Materials |  |  |  |  |  |  |  |
| MgO | 139.5 | 100.7 | 78.7 | 57.8 | 37.7 | 24.8 | 12.2 |
| Al$_2$O$_3$ | 348.2 | 335.0 | 327.6 | 320.4 | 313.6 | 309.2 | 305.0 |
| SiO$_2$ | 512.3 | 492.9 | 481.9 | 471.4 | 461.4 | 454.9 | 448.7 |
| MnO$_2$ | — | 71.5 | 111.8 | 150.4 | 187.3 | 211.0 | 234.2 |

As indicated previously, the batch ingredients may comprise any material which when melted together will be converted to the oxides in their proper proportions. Sample 1 has a composition of pure (100%) magnesium-cordierite while Samples 2-7 have compositions represented by the formula 2RO.2Al$_2$O$_3$.5SiO$_2$. Batches from the above glasses were melted in platinum crucibles for 7 hours in air at temperatures of from 1550° C. for samples rich in MnO to 1650° C. for samples rich in MgO.

The melts were poured into water (drigaged) to yield quenched streams of glass which can then be troast milled to a median particle size of about 8-12 microns. In general samples so prepared can then be fashioned into parts or coatings by dry pressing, slip casting or extruding.

EXAMPLE I

Powdered glass having the composition of Sample 5 in Table I was prepared by melting the raw batch materials at 1650° C. for 7 hours in air. The glass produced was drigaged, dried and reduced to powder by troast milling to a median particle size of 8-10 microns. With the aid of 3% Carbowax (polyethylene glycol, Union Carbide, New York City) dissolved in water, the powder was granulated. The powder glass granules obtained were then pressed in a die into $3''\times\frac{1}{2}''\times\frac{1}{4}''$ bars. Articles so produced when fired in air at the rate of 300° C./hr. to 1150° C. for 2 hours had 0.0% porosity and a coefficient of thermal expansion of $13.7\times10^{-7}/°C$. (25°-1000° C.). Good expansions have been obtained whether firing was accomplished in air, oxygen or vacuum.

EXAMPLE II

Glass powders having the same composition as the one in Example I and prepared in a similar manner were dry blended with 6 wt.% Methocel-4000 (methyl cellulose, Dow Chemical, Midland, Mich.) and 0.5 wt.% diglycol stearate and plasticized in a mix-muller with water (25.5-29.0 wt. %). Long honeycomb blocks, 3 $\frac{1}{2}''\times7''\times4''$ were easily extruded having 143 triangular cells per square inch of cross-section. The blocks were loaded with cells vertical on $2''\times4''$ CRYSTAR brand supports (Norton Company, Worcester, Mass.), the 4" top width of which had been ground to a thin 1/16" thickness to reduce the heat capacity. A number of $\frac{1}{8}''$ slots were sawed through the supports then (1/16") top surface leaving $\frac{1}{4}''$ wide slots. A 3" high band of 20 mil Fiberfrax (fibrous ceramic, Carborundum Co., Niagra Falls, N.Y.) was placed around the bottom of the samples and a $\frac{3}{4}''$ thick setter was placed on top with the center cut out leaving $\frac{7}{8}''$ width at the sides and $1\frac{1}{8}''$ width at the ends. The sample was fired at a rate of 1100° C./hr. to 1100° C. and held for $1\frac{3}{4}$ hours and then cooled at a rate of 250° C./hr. The average thermal expansion for such samples was $12.5\times10^{-7}/°C$. from 25° C.-1000° C. Porosimeter analysis yielded a wall porosity of 0.0%. In addition such samples were crack free and showed no distortions.

EXAMPLE III

Raw batches having the compositions of Samples 2, 4, 6 and 7 of Table I were fabricated into two sets of $3''\times\frac{1}{2}''\times\frac{1}{4}''$ bars as described in Example I. One set was then fired at 25° C./hr., and the other set was fired at 200° C./hr. The coefficients of thermal expansion were determined for both groups after firing. The bars fired at the rate of 25° C./hr. were fired to temperatures of 950° C. and 1150° C., respectively, with a 2 hour soak at each level, while the bars fired at the 200° C./hr. rate were fired to 940° C. and 1140° C., respectively, with the same 2 hour soak time. The following recorded data shows the effect of heating rates on the expansion of the sample. Increased firing rates generally results in higher expansion values. The results also indicate that with increasing MnO concentrations a higher than 950° C. firing temperature is necessary for complete crystallization to the cordierite crystal structure.

| Samples | Coefficient of Thermal Expansion ($10^{-7}$ in/in. °C., 25°-1000° C.) | | | |
| --- | --- | --- | --- | --- |
|  | 2 | 4 | 6 | 7 |
| 25° C./hr. rise rate |  |  |  |  |
| 950° C. soak | 14.5 | 17.0 | 40.0 | 41.0 |
| 1150° C. soak | 15.2 | 15.6 | 13.4 | 15.4 |
| 200° C./hr. rise rate |  |  |  |  |
| 940° C. soak | 16.0 | 21.8 | 39.0 | 38.4 |
| 1140° C. soak | 15.2 | 18.0 | 17.0 | 21.4 |

EXAMPLE IV

Samples 1, 2, 5, 6 and 7 prepared in the manner described in Example I were pressed into bars and heated to a temperature of 1140° C. for 2 hours. The bars, which after firing had the dimensions of about $2.6''\times\frac{1}{4}''\times\frac{1}{8}''$, were then heated to determine the D.C. volume electrical resistivity thereof at temperatures in the range of 300°-550° C. The following log resistivity (p) values (ohm-centimeters), were recorded:

| Temperatures (°C.) | Log p (ohm-centimeters) | | | | |
| --- | --- | --- | --- | --- | --- |
|  | 1 | 2 | 5 | 6 | 7 |
| 310 | 10.92 | 13.77 | 13.44 | 13.20 | 11.69 |
| 356 | 10.05 | 12.76 | 12.44 | 12.37 | 11.01 |
| 418 | 9.30 | 11.35 | 11.85 | 11.71 | 10.34 |
| 517 | 8.33 | 10.79 | 10.72 | 10.63 | 9.20 |

EXAMPLE V

A raw batch having a composition as given in Sample 5 was melted in air at a temperature of 1650° C. to form a glass. The glass was reduced to a powder having a median particle size of 9.6 microns by troast milling. The powder was then cerammed (crystallized) at a temperature of 1150° C. for $3\frac{1}{2}$ hours to the cordierite crystal structure and then reduced to powder having a median particle size of 11.5 microns. Bars $3''\times\frac{1}{2}''\times\frac{1}{4}''$ prepared from the powder by dry pressing, were fired and held at 1300° C. The glass-ceramic bars produced were sintered to imperviousness and had coefficients of thermal expansions of $17\times10^{-7}/°C$. (25° C.-1000° C.).

EXAMPLE VI

A glass having the same composition and similarly prepared as described in Example V was drigaged (e.g. quenched as a thin stream in water), and some of the glass particles obtained as a result were heat treated (cerammed) at a temperature of 1150° C. for $3\frac{1}{2}$ hours, while the others were crystallized at 1050° C. for 6 hours. The manganese cordierite particles formed in both cases were reduced to powders having a median particle size of 7.8 microns and formed in two $3''\times\frac{1}{2}''\times\frac{1}{4}''$ specimens. These specimens were then fired to a temperature of 1300° C. to form the impervious sintered glass-ceramic bodies.

We claim:
1. A method of producing an impervious glass-ceramic product having a cordierite crystal structure which comprises:
   formulating a raw batch which will form glass having a molar composition within the range 1.7-2.4RO.1.9-2.4Al$_2$O$_3$.4.5-5.2SiO$_2$ where RO consists essentially of 10–75 mole percent MgO and 25–90 mole percent MnO, melting the raw batch to form a glass, producing powder from the glass, fashioning powder derived from the glass into the shape of the product, and firing the shaped powder to a temperature of from 950° C. to 1450° C. for a sufficient time to sinter to the impervious glass-ceramic product.

2. The method of claim 1 further comprising reducing the glass to a powder having a particle size of −325 (Tyler) mesh, and then fashioning the glass powder into the shape of the product prior to firing.

3. The method of claim 1 further comprising:

reducing the glass to a particulate form, crystallizing the glass particles to the cordierite crystal structure and reducing the crystallizing particles to a powder having a particle size of < −325 (Tyler) mesh prior to fashioning the powder into the shape of the product and firing.

4. The method of claim 3 wherein the firing temperature is in the range of 1250°–1300° C.

5. The method of claim 1 wherein the glass formed has the approximate molar composition of $2RO \cdot 2Al_2O_3 \cdot 5SiO_2$.

6. The method of claim 5 wherein RO has the composition of 20–60 mole percent MgO and 40–80 mole percent MnO.

7. The method of claim 1 wherein the glass powder has a median particle size of about 8–12 microns.

8. The method of claim 1 wherein sintering is performed in a vacuum.

9. The method of claim 1 wherein sintering is performed in oxygen.

10. The method of claim 4 or 5 wherein the firing temperature does not exceed 1300° C.

* * * * *

UNITED STATES PATENT AND TRADEMARK OFFICE
CERTIFICATE OF CORRECTION

PATENT NO. : 4,219,344

DATED : August 26, 1980

INVENTOR(S) : William H. Armistead and Irwin M. Lachman

It is certified that error appears in the above–identified patent and that said Letters Patent are hereby corrected as shown below:

Column 3, line 18, change "about" to -- above --.

Column 3, line 68, change "effect" to -- affect --.

Column 6, line 30, under sample 2, change "11.35" to -- 11.85 --.

Signed and Sealed this

Ninth Day of December 1980

[SEAL]

*Attest:*

SIDNEY A. DIAMOND

*Attesting Officer*  *Commissioner of Patents and Trademarks*